US009499145B2

(12) United States Patent
Moulik et al.

(10) Patent No.: US 9,499,145 B2
(45) Date of Patent: Nov. 22, 2016

(54) PRESSURIZED GAS RESERVOIRS INCLUDING AN ELASTOMERIC WALL

(71) Applicant: Firestone Industrial Products Company, LLC, Indianapolis, IN (US)

(72) Inventors: Pradipta N. Moulik, Carmel, IN (US); Stephen C. Street, Carmel, IN (US); Graham R. Brookes, Noblesville, IN (US); Joshua R. Leonard, Noblesville, IN (US); Jeffrey T. Capek, Fishers, IN (US); Jason B. Smith, Avon, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 199 days.

(21) Appl. No.: 14/247,247

(22) Filed: Apr. 7, 2014

(65) Prior Publication Data

US 2014/0299215 A1 Oct. 9, 2014

Related U.S. Application Data

(60) Provisional application No. 61/808,985, filed on Apr. 5, 2013.

(51) Int. Cl.
*B60T 8/32* (2006.01)
*B60C 23/16* (2006.01)
(Continued)

(52) U.S. Cl.
CPC ............. *B60T 8/3285* (2013.01); *B60C 23/16* (2013.01); *B60G 11/27* (2013.01); *B60G 11/30* (2013.01); *B60G 17/0523* (2013.01); *F17C 1/16* (2013.01); *B60G 2300/042* (2013.01); *B60T 17/06* (2013.01); *F16J 12/00* (2013.01); *F17C 2201/0109* (2013.01); *F17C 2201/0123* (2013.01); *F17C 2201/035* (2013.01); *F17C 2201/056* (2013.01); *F17C 2203/013* (2013.01); *F17C 2203/0604* (2013.01); *F17C 2203/0617* (2013.01);*F17C 2203/0619* (2013.01); *F17C 2203/0663* (2013.01); *F17C 2203/0675* (2013.01); *F17C 2203/0685* (2013.01);

(Continued)

(58) Field of Classification Search
CPC .................... B60T 8/3285; F17C 1/16; F17C 2270/0171; F17C 2270/0134; B60G 11/30; B60G 11/27; B60G 17/0523; B60C 23/16
USPC .......... 220/562, 581, 560.07; 303/1; 138/30
See application file for complete search history.

(56) References Cited

U.S. PATENT DOCUMENTS

| 917,891 | A | * | 4/1909 | Pflager | .................. B60T 15/021 188/205 R |
| 5,758,796 | A | * | 6/1998 | Nishimura | ................. F17C 1/06 220/590 |
| 2010/0289197 | A1 | * | 11/2010 | Leonard | .................. B60G 11/27 267/113 |

*Primary Examiner* — Mary McManmon
*Assistant Examiner* — Nicole Wentlandt
(74) *Attorney, Agent, or Firm* — Thomas R. Kingsbury; Fay Sharpe LLP (57) ABSTRACT

A pressurizable gas reservoir can include a first end member and a second end member that is disposed in longitudinally-spaced relation to the first end member. A flexible reservoir member can extend between opposing first and second ends. The first end secured to the first end member and the second end secured to the second end member. The flexible reservoir member at least partially defines a reservoir chamber between the first and second end members that is capable of storing a quantity of pressurized gas for an extended duration of time. The first and second end members can be maintained in substantially-fixed axial position relative to one another. A suspension system including such a pressurized gas reservoir and a method of assembly are also included.

20 Claims, 8 Drawing Sheets

(51) Int. Cl.
*B60G 17/052* (2006.01)
*B60G 11/27* (2006.01)
*B60G 11/30* (2006.01)
*F17C 1/16* (2006.01)
*B60T 17/06* (2006.01)
*F16J 12/00* (2006.01)

(52) U.S. Cl.
CPC .............. *F17C 2205/0138* (2013.01); *F17C 2205/0153* (2013.01); *F17C 2205/0397* (2013.01); *F17C 2209/234* (2013.01); *F17C 2223/0123* (2013.01); *F17C 2223/035* (2013.01); *F17C 2270/0168* (2013.01); *F17C 2270/0171* (2013.01); *Y10T 29/49622* (2015.01); *Y10T 137/6914* (2015.04)

PRESSURIZED GAS RESERVOIRS INCLUDING AN ELASTOMERIC WALL

This application claims priority from U.S. Provisional Patent Application No. 61/808,985, filed on Apr. 5, 2013, which is hereby incorporated herein by reference in its entirety.

BACKGROUND

The subject matter of the present disclosure broadly relates to the art of pressurized gas systems and, more particularly, to pressurized gas reservoirs that include at least one exterior wall that is at least partially formed from an elastomeric material.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with pressurized gas reservoirs of non-wheeled vehicles and/or support structures associated with industrial machinery, components thereof and/or other such equipment. Accordingly, the subject matter of the present disclosure is not intended to be limited to use associated with pressurized gas systems of wheeled vehicles.

In some cases, it has been deemed desirable to reduce the overall weight of motor vehicles, such as to improve fuel efficiency and/or to increase the transportable payload for the same gross weight of a vehicle. Reducing the weight of one or more components of the pressurized gas system of vehicles can be one contributing factor to achieving such a goal. In many cases, conventional pressurized gas reservoirs have been designed to be capable of maintaining a predetermined size and shape during use in storing a quantity of pressurized gas. As such, known pressurized gas reservoirs are often constructed from metal materials to provide desired performance characteristics, such as strength, rigidity and structural robustness of the reservoir and/or the components and/or elements thereof. Reducing the size of such known reservoirs could be useful in contributing to the reduced weight of a vehicle suspension system, such as has been described above. However, it has been recognized that such size reductions can result in undesirable reductions in contained gas volume and/or other performance characteristics.

Notwithstanding the widespread usage and overall success of conventional designs for pressurized gas system components that are known in the art, it is believed that a need exists to meet these competing goals while still retaining comparable or improved performance, ease of manufacture, ease of assembly, ease of installation, reduced cost of manufacture and/or otherwise advancing the art of pressurized gas systems.

BRIEF DESCRIPTION

One example of a pressurizable gas reservoir in accordance with the subject matter of the present disclosure is dimensioned for securement between associated first and second structural components having a fixed spacing therebetween. The pressurizable gas reservoir can include a first end member and a second end member that is disposed in longitudinally-spaced relation to the first end member such that a longitudinal axis is defined therebetween. A flexible reservoir member can extend peripherally about the longitudinal axis and axially between opposing first and second ends. The first end can be secured to the first end member such that a substantially fluid-tight seal is formed therebetween. The second end can be secured to the second end member such that a substantially fluid-tight seal is formed therebetween. The flexible reservoir member can at least partially define a reservoir chamber between the first and second end members that is capable of storing a quantity of pressurized gas for an extended duration of time. The first and second end members can be maintained in a substantially-fixed axial position relative to one another such that the reservoir chamber has an approximately constant volume with any substantial variation in the approximately constant volume being primarily due to elastomeric expansion and recovery of the flexible reservoir member as gas pressure within the reservoir chamber respectively increases and decreases.

One example of a suspension system in accordance with the subject matter of the present disclosure can include a pressurizable gas reservoir according to the foregoing paragraph. A pressurized gas source can be selectively operative to generate pressurized gas, and a control device can be disposed in fluid communication between the pressurized gas source and the pressurizable gas reservoir such that pressurized gas can be selectively transferred into and out of the reservoir chamber of the pressurizable gas reservoir.

One example of a vehicle in accordance with the subject matter of the present disclosure can include a first structural component and a second structural component disposed in spaced relation to the first structural component and secured in substantially fixed position relative thereto. A pressurizable gas reservoir according to the above paragraph with the first end member secured to the first structural component and the second end member disposed in spaced relation to the first end member and secured to the second structural component.

One example of a method of assembly in accordance with the subject matter of the present disclosure can include providing a first end member and a second end member. The method can also include providing a flexible reservoir member that extends between opposing first and second ends and is at least partially formed from an elastomeric material. The method can further include securing the first end member to first end of the flexible reservoir member such that a substantially fluid-tight seal is formed therebetween. The method can also include securing the second end member to the second end of the flexible reservoir member such that a reservoir chamber is at least partially defined therebetween. The method can further include securing the first and second end members in substantially fixed relation to one another to one another between the first and second structural components such that the reservoir chamber has an approximately constant volume with any substantial variation in the approximately constant volume being primarily due to elastomeric expansion and recovery of the flexible reservoir member as gas pressure within the reservoir chamber respectively increases and decreases.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
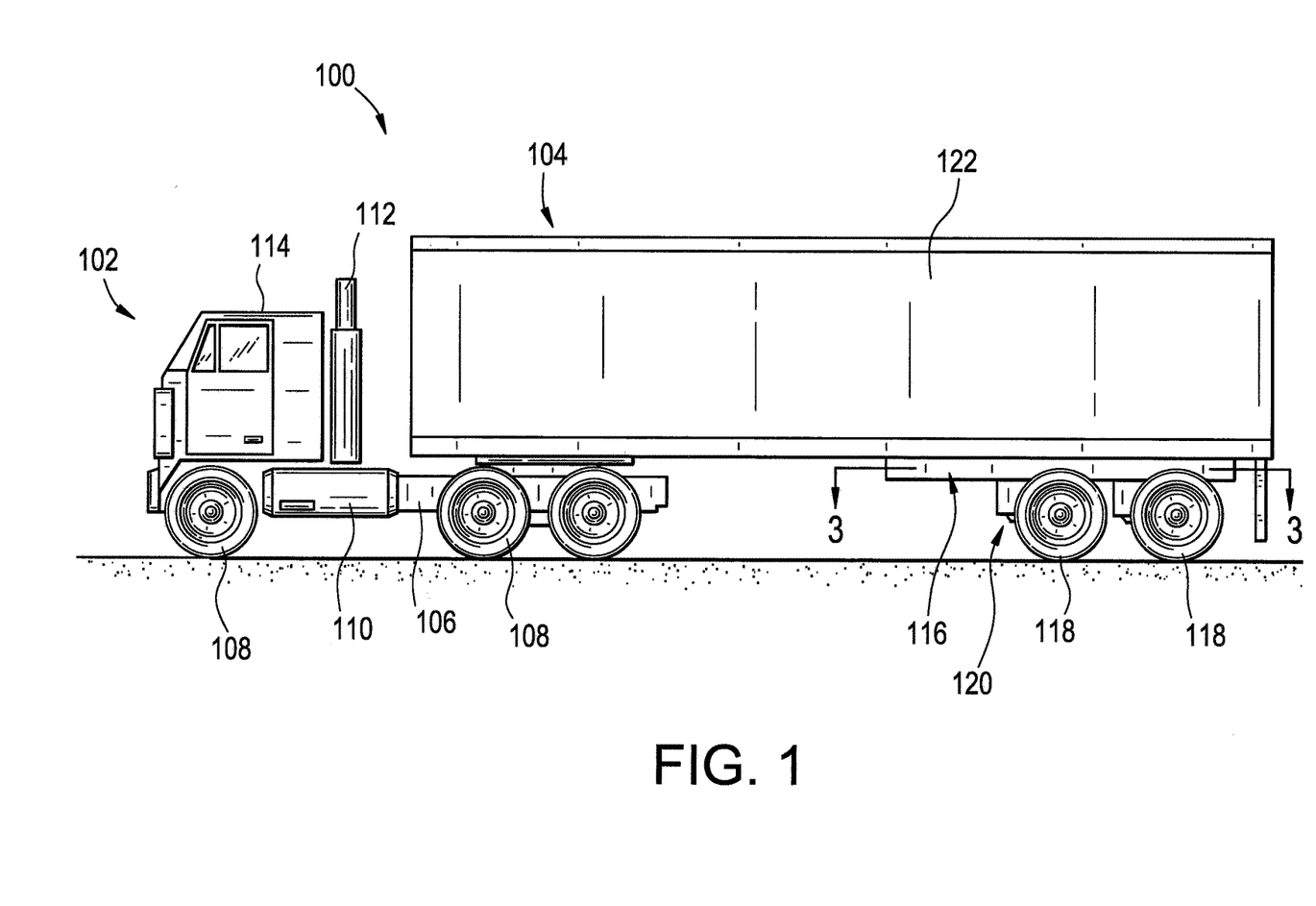
FIG. 1 is a graphical representation of one example of a vehicle including a vehicle frame suitable for mounting a pressurized gas reservoir in accordance with the subject matter of the present disclosure.

With reference to FIG. 1, a vehicle 100 is shown as taking the form of a tractor-trailer combination that includes an over-the-road tractor 102 and a trailer 104 that is operatively connected to the tractor for over-the-road transport. Tractor 102 is shown as including a frame 106 that is supported on a plurality of wheels 108 by a tractor suspension system (not shown). Tractor 102 will typically also include an internal combustion engine (not shown) and drivetrain (not shown) that are supported on the frame and provide motive power to wheels 108. Tractor 102 can include a fuel tank 110 and an exhaust stack 112 that are operatively associated with the engine.

Tractor 102 will also include a tractor braking system (not shown) that is operatively associated with wheels 108 and dissipates kinetic energy associated with vehicle 100. A conventional braking system will also provide emergency and parking brake functions. The tractor can also include a passenger compartment or cab 114 that can be supported on or along frame 106, such as by way of a cab suspension (not shown), for example.

Trailer 104 is also shown as including a frame 116 that is supported on a plurality of wheels 118 by a trailer suspension system 120. Trailer 104 can also include a trailer body 122 that is at least partially supported on frame 116 and is generally dimensioned to receive and retain a quantity of cargo. Trailer 104 will also, typically, include a trailer braking system (not shown) that is operatively associated with wheels 118 and can assist in dissipating kinetic energy associated with vehicle 100.

Figure 2:
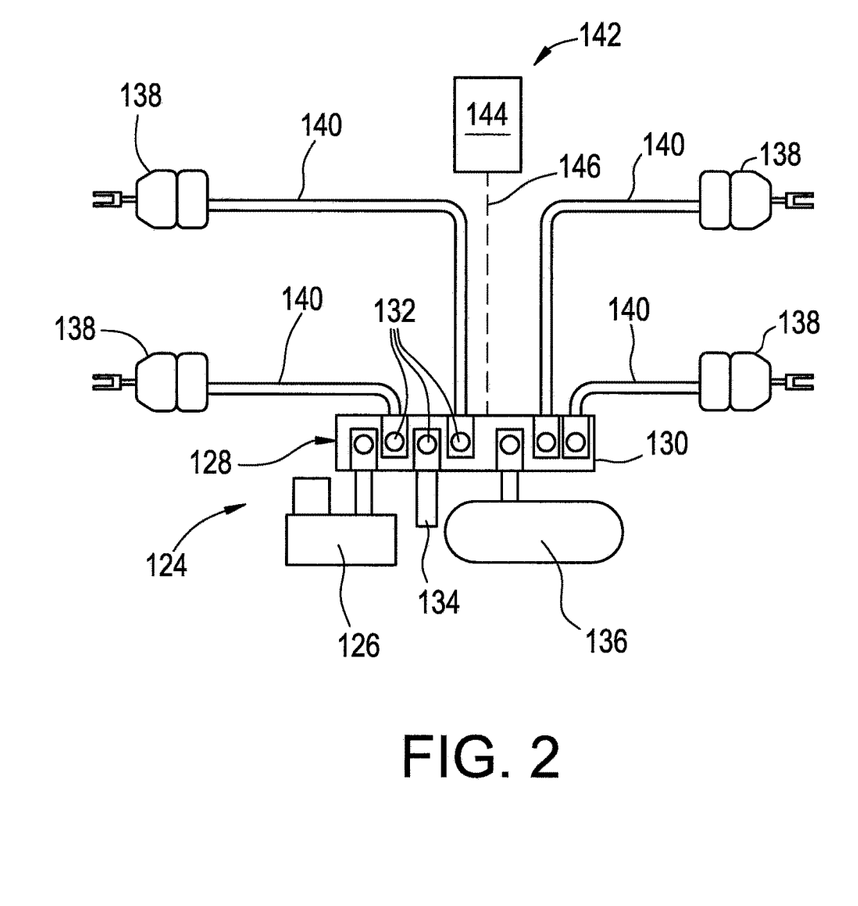
FIG. 2 is a greatly simplified schematic representation of one example of a pressurized gas system including a pressurized gas reservoir in accordance with the subject matter of the present disclosure.

It will be appreciated that numerous components and/or systems of vehicle 100 can utilize pressurized gas (e.g., air) in association with the operation thereof (e.g., as a power source). Such components and/or systems can include the tractor suspension system, the tractor braking system, the cab suspension system, the trailer suspension system and/or the trailer braking system. One greatly-simplified example of a pressurized gas system 124 that can be operatively associated with one or more of the components and/or systems of vehicle 100 is shown in FIG. 2. Pressurized gas system 124 can be operatively associated with one or more components and/or systems of the vehicle in any suitable manner for selectively supplying pressurized gas (e.g., air) thereto and selectively transferring pressurized gas therefrom.

In the exemplary embodiment shown in FIG. 2, pressurized gas system 124 includes a pressurized gas source, such as a compressor 126, for example, for generating pressurized air or other gases. A control device, such as a valve assembly 128, for example, is shown as being in communication with compressor 126 and can be of any suitable configuration or arrangement. In the exemplary embodiment shown, valve assembly 128 includes a valve block 130 with a plurality of valves 132 supported thereon. Valve assembly 128 can also, optionally, include a suitable exhaust, such as a muffler 134, for example, for venting pressurized gas from the system. Pressurized gas system 124 can also include a reservoir 136 in accordance with the subject matter of the present disclosure, which is shown as being in fluid communication with the compressor and/or the valve assembly and suitable for storing pressurized gas for an extended duration of time, such as may be measured in terms of one or more hours, one or more days, one or more weeks or one or more months, for example.

In some cases, the tractor braking system and/or the trailer braking system can include one or more brake actuators 138, which can be of a conventional construction. In the arrangement shown in FIG. 2, valve assembly 128 is in communication with brake actuators 138 through gas transfer lines 140. As such, pressurized gas can be selectively transferred into and/or out of the brake actuators through valve assembly 128 by selectively operating valves 132. As indicated above, it will be appreciated that pressurized gas system 124 is greatly simplified and merely illustrates one example of a pressurized gas system with which a pressurized gas reservoir in accordance with the subject matter of the present disclosure can be used.

In some cases, pressurized gas system 124 can include a control system 142 that is capable of communication with any one or more systems and/or components (not shown) of vehicle 100, such as for selective operation and/or control thereof. Control system 142 can include a controller or electronic control unit (ECU) 144 communicatively coupled with compressor 126 and/or valve assembly 128, such as through a conductor or lead 146, for example, for selective operation and control thereof, which can include supplying and exhausting pressurized gas to and/or from the pressurized gas system. It will be appreciated that controller 144 can be of any suitable type, kind and/or configuration.

Figure 3:
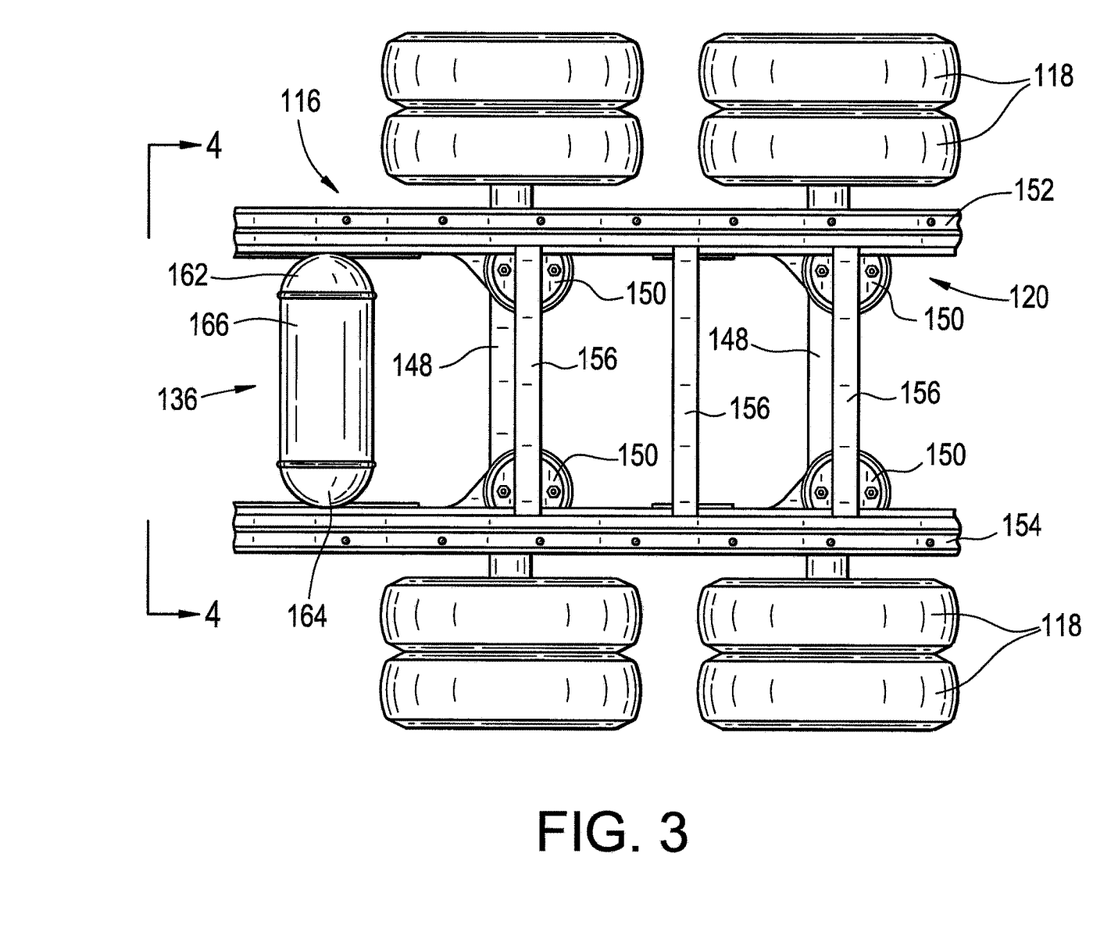
FIG. 3 is a top plan view taken from along line 3-3 in FIG. 1 of the vehicle frame with one example of a pressurized gas reservoir in accordance with the subject matter of the present disclosure mounted thereon.

As shown in FIG. 3, wheels 118 of trailer 104 are supported on axles 148 with trailer suspension system 120 operatively connected between the axles and frame 116. It will be appreciated that the trailer suspension system can include any suitable components and/or systems, such as may be known in the art. For example, trailer suspension system 120 is shown as including a plurality of gas spring assemblies 150 that are operatively connected between axles 148 and frame 116. It will be appreciated, however, that any other suitable configuration and/or arrangement could alternately be used.

It will be recognized and understood that a pressurized gas reservoir in accordance with the subject matter of the present disclosure can be mounted or otherwise supported on, along or otherwise between associated structural components of any suitable type, kind, configuration and/or construction, and can be secured thereto in any suitable manner. In some cases, associated structural components with which a pressurized gas reservoir in accordance with the subject matter of the present disclosure can be used can include structural components of a vehicle that are maintained in generally fixed relation to one another. Non-limiting examples of such structural components can include structural features of a tractor and/or trailer, such as components of a frame, body or cab, for example.

Figure 4:
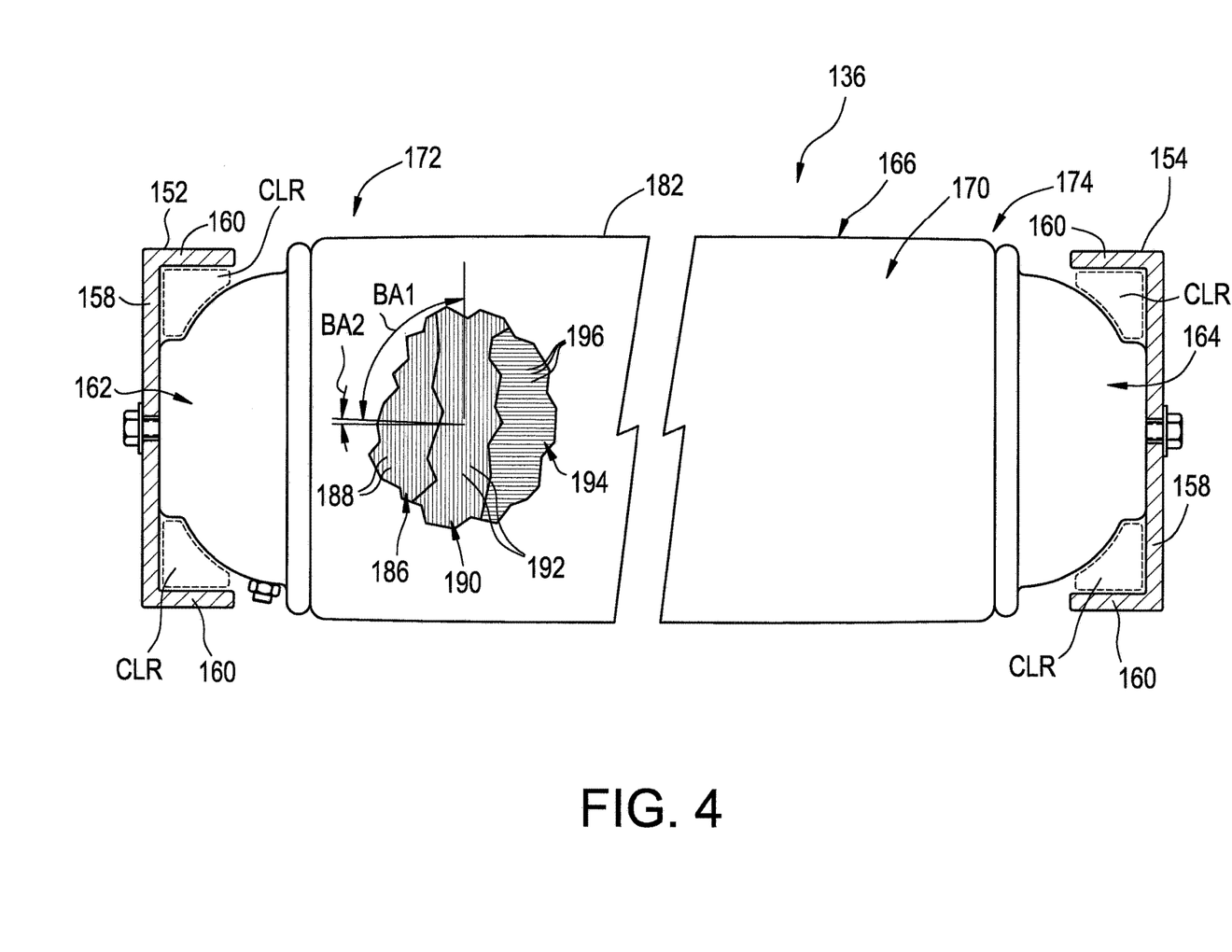
FIG. 4 is a side view, in partial cross section, taken from along line 4-4 in FIG. 3 of the vehicle frame and pressurized gas reservoir in FIG. 3.
Figure 5:
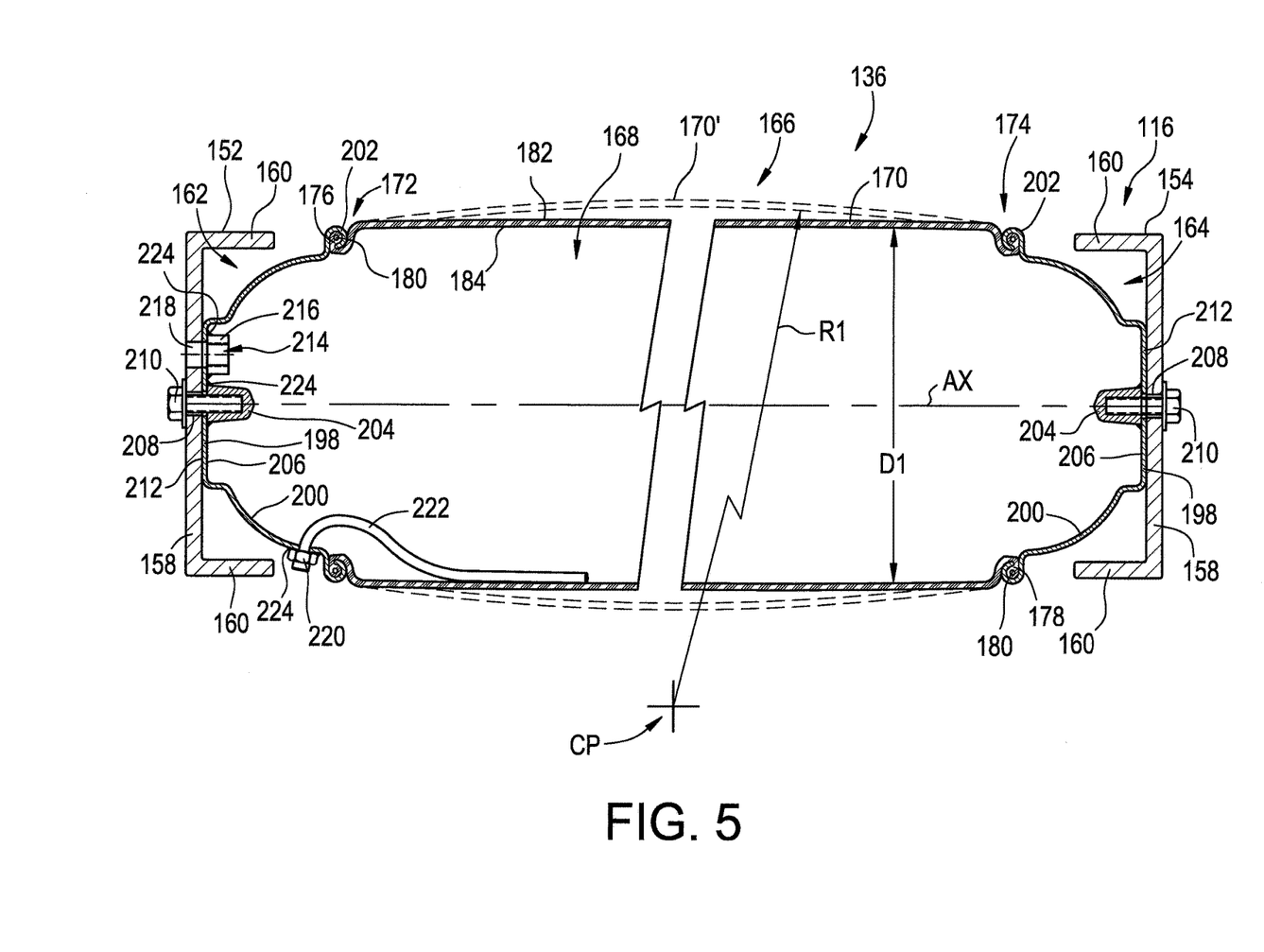
FIG. 5 is a cross-sectional side view of the vehicle frame and pressurized gas reservoir in FIGS. 3 and 4.

In the exemplary configuration shown in FIGS. 1 and 3-5, frame 116 includes frame rails 152 and 154 that are spaced apart from one another. In some cases, cross-braces 156 can be rigidly interconnected between frame rails 152 and 154. In this manner, the distance or spacing between frame rails 152 and 154 can be established and maintained such that the frame rails remain in substantially fixed relation to one another during use. As shown in FIGS. 4 and 5, the frame rails can, in some cases, take the form of C-channels that include a web 158 and opposing flanges 160. Additionally, frame rails 152 and 154 extend lengthwise along trailer body 122 and are oriented such that webs 158 face outward with flanges 160 extending inward therefrom. It will be appreciated, however, that frame 116 and frame rails 152 and 154 thereof are merely exemplary and that other constructions, configurations and/or arrangements can alternately be used without departing from the subject matter of the present disclosure.

Pressurized gas reservoir 136 is shown in FIGS. 3-5 as being supported between frame rails 152 and 154 of frame 116 a substantially-fixed axial spacing can maintained between the end members of the pressurized gas reservoir. Pressurized gas reservoir 136 has a longitudinally-extending axis AX (FIG. 5) and can include one or more end members, such as an end member 162 and an end member 164 that is spaced longitudinally from end member 162. A flexible reservoir member 166 can extend peripherally around axis AX and can be secured between the end members in a substantially fluid-tight manner such that a reservoir chamber 168 (FIG. 5) is at least partially defined therebetween.

Flexible reservoir member 166 can be of any suitable size, shape, construction and/or configuration. As one example, flexible reservoir member 166 can include a flexible wall 170 that is at least partially formed from one or more layers or plies of elastomeric material (e.g., natural rubber, synthetic rubber and/or thermoplastic elastomer) and can optionally include one or more plies or layers of filament reinforcing material. Flexible wall 170 is shown extending in a longitudinal direction between opposing ends 172 and 174. In some cases, flexible reservoir member 166 can, optionally, include a mounting bead disposed along either one or both of ends 172 and 174 of the flexible wall. In the arrangement shown in FIG. 5, mounting beads 176 and 178 are shown as being respectively disposed along ends 172 and 174. In some cases, the mounting beads can, optionally, include a reinforcing element, such as an endless, annular bead wire 180, for example.

Additionally, as indicated above, flexible wall 170 of flexible reservoir member 166 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 170 can include an outer surface 182 and an inner surface 184, which can at least partially define reservoir chamber 168. Additionally, as identified in FIG. 4, flexible wall 170 can include an outer or cover ply (not identified) that at least partially forms outer surface 182, an inner or liner ply (not identified) that at least partially forms inner surface 184, and one or more reinforcing plies disposed between outer and inner surfaces 182 and 184. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization or curing, for example.

Additionally, it will be appreciated that the one or more lengths of filament material, if provided, can be oriented in any suitable manner. As one example, the flexible wall can include at least one layer or ply with lengths of filament material oriented radially (i.e., extending peripherally about and oriented generally transverse to axis AX) and at least one layer or ply with lengths of filament material oriented longitudinally (i.e., extending lengthwise along and in approximate alignment with axis AX). In the arrangement shown in FIG. 4, flexible wall 170 includes a radial reinforcing ply 186 with a plurality of filament segments 188 disposed at a bias angle BA1 that is transverse to axis AX. Flexible wall 170 is also shown as including another radial reinforcing ply 190 with a plurality of filament segments 192 disposed at bias angle BA1 with respect to axis AX. Flexible wall 170 is shown as further including a longitudinal reinforcing ply 194 with a plurality of filament segments 196 disposed at a bias angle BA2 that is generally transverse to filament segments 188 and/or 192 and can, in some cases, be disposed in approximate alignment with axis AX.

It will be appreciated that flexible reservoir member 166 can be of any suitable size, shape, configuration and/or arrangement, and can be constructed to assume any such size, shape, configuration and/or arrangement during use in storing a quantity of pressurized gas. In some cases, flexible wall 170 of flexible reservoir 166 can have an approximately linear cross-sectional shape during use, such as is shown in FIGS. 3-5, for example. In many cases, the flexible wall will assume a curved cross-sectional shape during use in storing a quantity of pressurized gas, such as is represented in FIG. 5 by dashed line 170' and represented by reference dimension R1, for example. In a preferred arrangement, flexible reservoir member 166 can be constructed such that in an inflated condition such that flexible wall 170' takes a curvature R1 with a centerpoint CP dimensioned in spaced relation to axis AX (i.e., radius R1 having a dimension greater than one-half of the nominal reservoir cross-sectional dimension, represented by reference dimension D1 in FIG. 5). And, in a more preferred construction, centerpoint CP can be spaced outside of pressurized gas reservoir 136 (i.e., radius R1 having a dimension greater than dimension D1), such as is shown in FIG. 5, for example. Accordingly, it will be appreciated that one or more reinforcing plies having any suitable bias angle or combination of bias angles can be used, such as bias angles within a range of from approximately 85 degrees to approximately 95 degrees, for example, for bias angle BA1 with respect to axis AX and/or such as bias angles within a range of from approximately −5 degrees to approximately 5 degrees, for example, for bias angle BA2 with respect to axis AX.

In some cases, the end members of pressurized gas reservoir 136 can differ substantially from one another. In other cases, however, the end members can be substantially similar to another, such as is shown in the arrangement in FIGS. 3-5, for example. End members 162 and 164 are shown as being formed from thin-walled metal material, and include a mounting wall portion 198, at least one side wall portion 200, and an outer peripheral wall portion 202. Though shown in FIGS. 4 and 5 as being formed from a unitary mass of material, it will be appreciated the wall portions of end member 162 and 164 can be formed, assembled and/or otherwise constructed in any suitable manner, and can include one or more walls connected in any suitable manner and that include any combination of one or more of the foregoing and/or other wall portions.

Furthermore, it will be appreciated that the end members of the pressurized gas reservoir can be operatively connected or otherwise secured to the flexible reservoir member in any suitable manner. For example, end members 162 and 164 are shown as being respectively secured to ends 172 and 174 of flexible wall 170 using a crimped-edge connections (not numbered) in which outer peripheral wall portion 202 of the end members is crimped or otherwise deformed respectively around mounting beads 176 and 178 such that a substantially fluid-tight seal is formed therebetween.

End members 162 and 164 can be secured on or along an associated structural component (e.g., frame rails 152 and 154) in any manner suitable for maintaining a substantially-fixed axial spacing between the first and second end members. For example, end members 162 and/or 164 can include an opening or hole (not numbered) extending through mounting wall portions 198 thereof. A mounting boss 204 can be secured along an inside surface 206 of the end members and can include a threaded passage (not numbered) that is accessible through the opening in the mounting wall portion. Additionally, webs 158 of frame rails 152 and 154 can include an opening or hole 208 that is in approximate alignment with the hole in mounting wall portions 198. A threaded fastener 210 can extend through and be secured along mounting wall portion 198 and can secure an outer surface 212 of end members 162 and 164 in abutting engagement with webs 158 of frame rails 152 and 154.

One or more fluid communication ports 214 can be provided to permit pressurized gas passage into and out of reservoir chamber 168, such as may be used for transferring pressurized gas to and/or from one or more other components and/or systems that utilize pressurized gas. In the arrangement shown, a connector fitting 216 is secured along inside surface 206 of end member 162 that includes communication port 214 such that the communication port is in fluid communication with reservoir chamber 168. An opening or hole 218 extends through web 158 of frame rail 152 and is disposed in approximate alignment with communication port 214. It will be appreciated, however, that any other suitable fluid communication arrangement could alternately be used. Additionally, in some cases, a connector fitting 220 can be included on or along at least one of end members 162 and 164, such as may be suitable for use as a selectively-operable valve or drain fitting. In such cases, a pickup tube 222 can be fluidically connected to connector fitting 220 such that condensate and/or other fluids can be selectively drained from reservoir chamber 168.

Components, such as mounting bosses 204, connector fitting 216 and/or connector fitting 220, can be secured on or along the end members in any manner suitable for forming a substantially fluid tight connection therebetween, such as by way of a flowed-material joints 224, for example. It will be appreciated, however, that other configurations and/or constructions could alternately be used.

Figure 6:
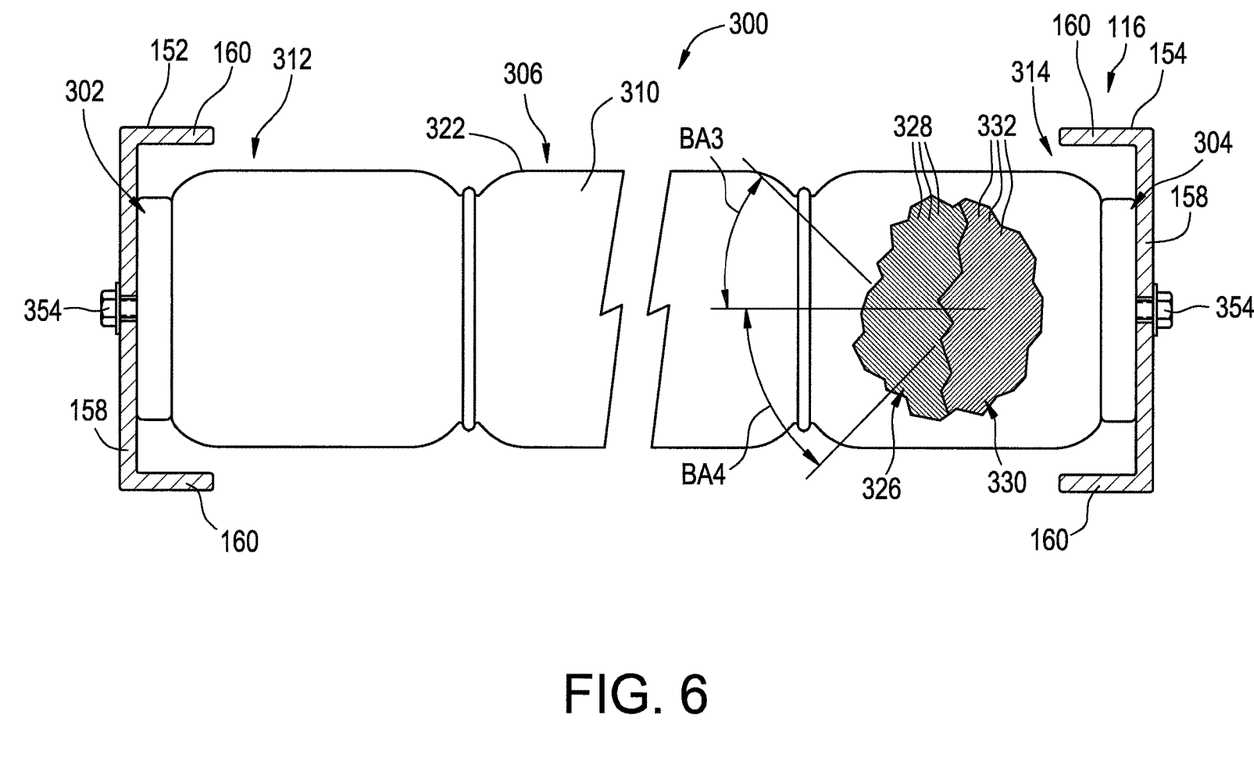
FIG. 6 is a side view, in partial cross section, of another example of a vehicle frame and pressurized gas reservoir in accordance with the subject matter of the present disclosure.
Figure 7:
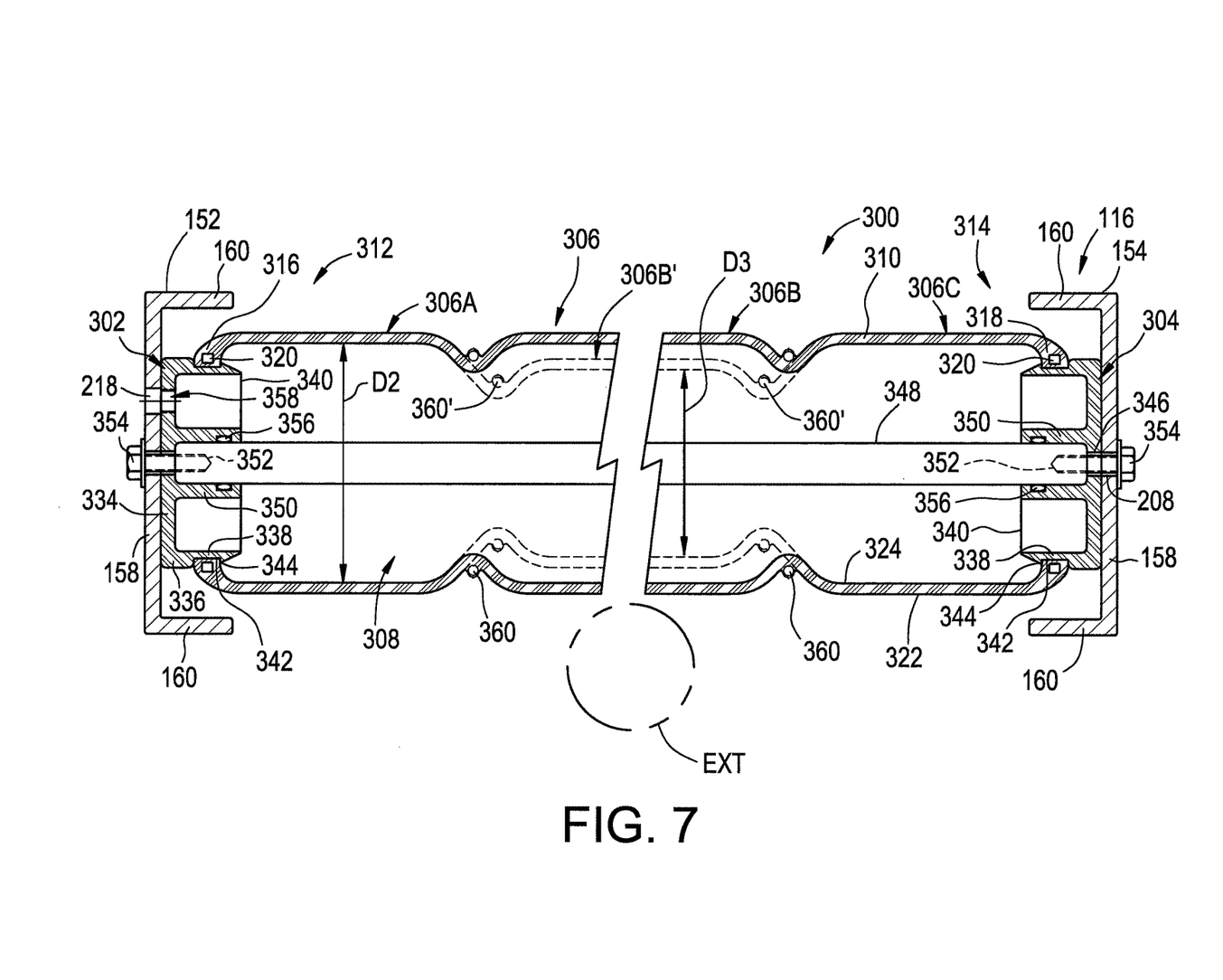
FIG. 7 is a cross-sectional side view of the vehicle frame and pressurized gas reservoir in FIG. 6.

Another example of a pressurized gas reservoir 300 in accordance with the subject matter of the present disclosure is shown in FIGS. 6 and 7. Pressurized gas reservoir 300 has a longitudinally-extending axis AX (FIG. 5) and can include one or more end members, such as an end member 302 and an end member 304 that is spaced longitudinally from end member 302. A flexible reservoir member 306 can extend peripherally around axis AX and can be secured between the end members in a substantially fluid-tight manner such that a reservoir chamber 308 (FIG. 7) is at least partially defined therebetween.

Flexible reservoir member 306 can be of any suitable size, shape, construction and/or configuration. As one example, flexible reservoir member 306 can include a flexible wall 310 that is at least partially formed from one or more layers or plies of elastomeric material (e.g., natural rubber, synthetic rubber and/or thermoplastic elastomer) and can optionally include one or more plies or layers of filament reinforcing material. Flexible wall 310 is shown extending in a longitudinal direction between opposing ends 312 and 314. In some cases, flexible reservoir member 306 can, optionally, include a mounting bead disposed along either one or both of ends 312 and 314 of the flexible wall. In the arrangement shown in FIG. 7, mounting beads 316 and 318 are shown as being respectively disposed along ends 312 and 314. In some cases, the mounting beads can, optionally, include a reinforcing element, such as an endless, annular bead wire 320, for example.

Additionally, as indicated above, flexible wall 310 of flexible reservoir member 306 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 310 can include an outer surface 322 and an inner surface 324, which can at least partially define reservoir chamber 308. Additionally, as identified in FIG. 4, flexible wall 310 can include an outer or cover ply (not identified) that at least partially forms outer surface 322, an inner or liner ply (not identified) that at least partially forms inner surface 324, and one or more reinforcing plies disposed between outer and inner surfaces 322 and 324. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Additionally, it will be appreciated that the one or more lengths of filament material, if provided, can be oriented in any suitable manner. As one example, the flexible wall can include at least one layer or ply with lengths of filament material oriented at a first bias angle and at least one layer or ply with lengths of filament material oriented at approximately the same bias angle but oriented in the opposing direction. In the arrangement shown in FIG. 6, for example, flexible wall 310 includes a reinforcing ply 326 with a plurality of filament segments 328 disposed at a bias angle BA3. Flexible wall 310 is also shown as including a reinforcing ply 330 with a plurality of filament segments 332 disposed at a bias angle BA4 that is at approximately the same bias angle relative to axis AX but oriented in the opposing direction. It will be appreciated that any suitable bias angles can be used, such as bias angles within a range of from approximately 3 degrees to approximately 87 degrees, for example, for bias angles BA3 and/or BA4. In a preferred arrangement, bias angles within a range of from approximately 40 degrees to approximately 60 degrees can be used. In a more preferred arrangement, bias angles within a range of from approximately 50 degrees to approximately 60 degrees can be used.

In some cases, the end members of pressurized gas reservoir 300 can differ substantially from one another. In other cases, however, the end members can be substantially similar to another, such as is shown in the arrangement in FIGS. 6 and 7, for example. End members 302 and 304 are shown as being molded or otherwise formed from a polymeric material and include a mounting wall portion 334, at least one side wall portion 336, and a retaining wall portion 338 that can project axially from along side wall portion 336 to a distal edge 340. In a preferred arrangement, retaining wall portion 338 can include an outer surface 342 dimensioned to form a substantially fluid-tight seal with an inner surface (not numbered) of mounting beads 316 and 318. In some cases, a retaining ridge 344 can project outwardly from along outer surface 342 and can assist in retaining the mounting beads of the flexible wall on or along retaining wall portion 338.

It will be appreciated that end members 302 and 304 can be formed or otherwise manufactured from any suitable material or combination of materials. In a preferred arrangement, however, end members 302 and 304 can be formed from a non-metallic material, such as a thermoplastic or thermoset material, for example. Examples of suitable non-metallic materials from which either or both of the end members can be formed include thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof.

End members 302 and 304 can be secured on or along an associated structural component (e.g., frame rails 152 and 154) in any manner suitable for maintaining a substantially-fixed axial spacing between the first and second end members. For example, end members 302 and/or 304 can include an opening or hole 346 extending through mounting wall portions 334 thereof. In some cases, a threaded insert or other securement device (not shown) could be molded or otherwise at least partially embedded into the end members. Alternately, a tie rod 348 can extend longitudinally between end members 302 and 304 to at least partially establish or otherwise assist in maintaining a substantially-fixed axial spacing between the end members. The end members can include a socket wall portion 350 that at least partially defines a socket or recess (not numbered) within which a portion of tie rod 348 can be received. In some cases, one or both ends of tie rod 348 can include a threaded passage 352 or other securement feature. Additionally, webs 158 of frame rails 152 and 154 can include an opening or hole 208 that is in approximate alignment with the hole 346. In such case, a threaded fastener 354 can extend through holes 208 and 346, and threadably engage threaded passage 352 of tie rod 348. In this manner, end members 302 and 304 can be secured to one another as well as on or along webs 158 of frame rails 152 and 154. In some cases, a sealing element 356 can be disposed between tie rod 348 and end members 302 and 304, such as may be operative to form a substantially fluid-tight seal therebetween.

One or more fluid communication ports 358 can be provided to permit pressurized gas passage into and out of reservoir chamber 308, such as may be used for transferring pressurized gas to and/or from one or more other components and/or systems that utilize pressurized gas. In the arrangement shown, the communication port is integrally formed along mounting wall portion 334 such that the communication port is in fluid communication with reservoir chamber 308. An opening or hole 218 can extend through web 158 of frame rail 152 and is disposed in approximate alignment with communication port 358. It will be appreciated, however, that any other suitable fluid communication arrangement could alternately be used.

In some cases it may be desirable to provide and/or maintain a space or clearance between the pressurized gas reservoir and/or components thereof and one or more external features. For example, it may be beneficial to size or otherwise dimension one or more of end members 162, 164, 302 and/or 304 such that clearance with flanges 160 of frame rails 152 and 154 are provided, such as is represented in FIG. 4 by dashed lines CLR, for example. Additionally, or in the alternative, it may be beneficial to constrain the size, shape and/or expansion of flexible reservoir members 166 and/or 306. In such cases, one or more restraining hoops 360 can extend peripherally about the flexible wall of the flexible reservoir member, such as is shown in FIG. 6, for example. In some cases, the one or more restraining hoops can be at least partially embedded within the flexible wall (e.g., flexible wall 306), such as may result from including the one or more restraining hoops within one or more layers of the elastomeric material of the flexible wall prior to curing (e.g., vulcanization) of the material of the flexible wall.

As indicated above, a pressurized gas reservoir in accordance with the subject matter of the present disclosure can be of any suitable size, shape and/or configuration. For example, a flexible reservoir member can have an approximately linear cross-sectional shape or a curved cross-sectional shape, such as is shown in FIG. 3-5. As another example, a flexible reservoir member can have two or more wall sections having the same or different sizes and/or shapes. In the arrangement shown in FIGS. 6 and 7, for example, flexible reservoir member 306 includes sections 306A, 306B and 306C disposed in axially-spaced relation to one another along flexible wall 310. Additionally, in the arrangement shown, sections 306A-C have a nominal cross-sectional dimension D2 that is at least approximately equal along the length of the flexible wall with restraining hoops 360 inhibiting substantial radial outward deflection of the flexible reservoir member.

As indicated above, it may, in some cases, be desirable to provide and/or maintain a space or clearance between the pressurized gas reservoir and/or components thereof and one or more external features. As such, it will be appreciated that the flexible reservoir member can be configured two or more sections having differing cross-sectional dimensions. As one example, flexible reservoir member 306 is shown in FIG. 7 as optionally including a section 306B' having a nominal cross-sectional dimension D3 that is less than dimension D2 of sections 306A and 306B. In this manner, a gap or additional clearance can be provided between the flexible wall and an external feature EXT extending along or otherwise adjacent pressurized gas reservoir 300. In such cases, restraining hoops 360' can be included and can have a reduced cross-sectional dimension, such as is shown in FIG. 7, for example.

Figure 8:
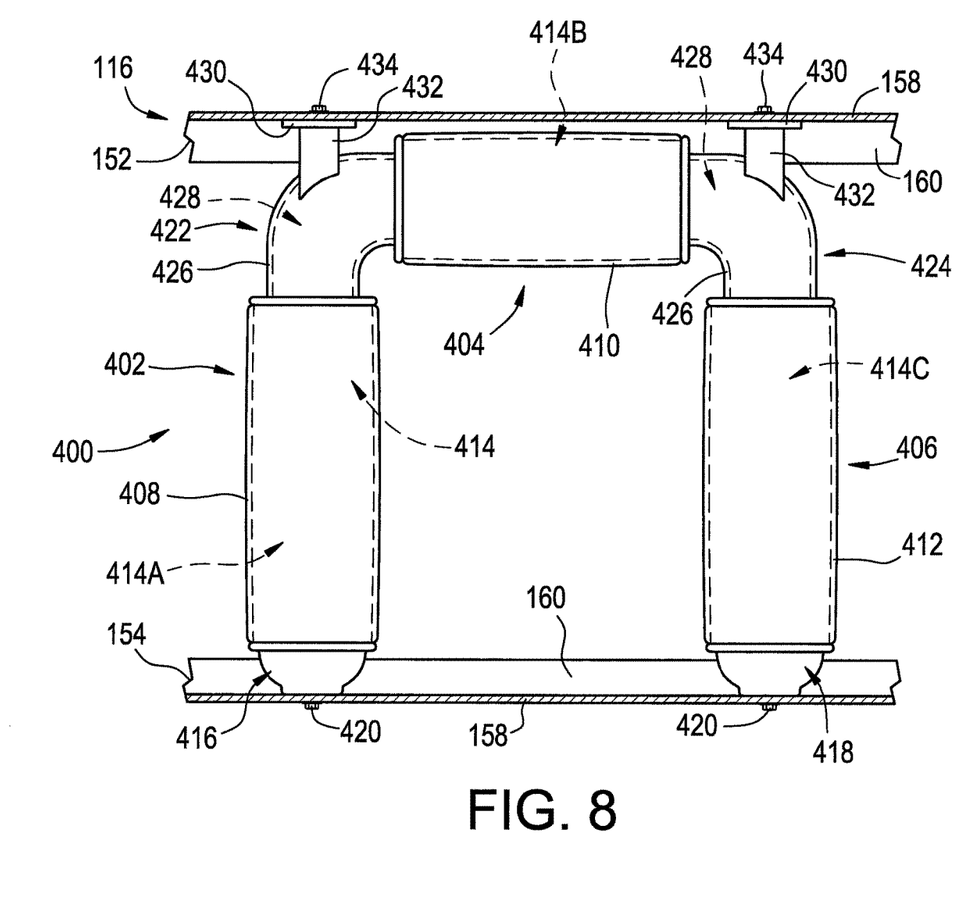
FIG. 8 is a top plan view, in partial cross section, of a further example of a vehicle frame with a pressurized gas reservoir in accordance with the subject matter of the present disclosure mounted thereon.

Another example of a pressurized gas reservoir 400 in accordance with the subject matter of the present disclosure is illustrated in FIG. 8. Pressurized gas reservoir 400 can include a plurality of flexible reservoir members, such as two or more of flexible reservoir members 166 and/or 306, for example. In a preferred arrangement, the flexible reservoir members can be fluidically connected with one another in a manner suitable for forming a substantially contiguous chamber or reservoir volume. In the arrangement shown in FIG. 8, for example, pressurized gas reservoir 400 includes flexible reservoir members 402, 404 and 406 that respectively include a flexible wall 408, 410 and 412 that each at least partially defines a section or portion of reservoir chamber 414, such as are represented by reference numbers 414A, 414B and 414C, respectively.

End members 416 and 418, such as may be similar to one of end members 162, 164, 302 and/or 304, for example, can be operatively connected along an end of flexible reservoir members 402 and 406. The flexible reservoir members can be oriented to extend across or otherwise between frame rails 152 and 154. In such cases, end members 416 and 418 can be secured on or along an associated structural component (e.g., frame rail 154) in any suitable manner. For example, end members 416 and 418 could be secured along web 158 of frame rail 154 using threaded fasteners 420, such as, for example, has been described above in greater detail.

Additionally, adjacent flexible reservoir members (e.g., flexible reservoir members 402 and 404, and/or flexible reservoir members 404 and 406) can be fluidically interconnected using one or more intermediate or connector end members or fittings 422 and 424 that are dimensioned to form a substantially fluid-tight seal with opposing ends of the adjacent flexible reservoir members. It will be appreciated that such connector end fittings can be of any suitable type, kind, construction and/or configuration. As one example, connector end fittings 422 and 424 can include one or more features (e.g., an outer peripheral wall portion) for engaging the flexible reservoir members, such as have been described above in connection with end members 162, 164, 302 and/or 304. Additionally, connector end fittings 422 and 424 can include a body wall or body wall portion 426 that at least partially defines a passage 428 through the connector end fitting. In such case, passages 428 can be connected in fluid communication with two or more of chamber sections 414A, 414B and/or 414C. In a preferred construction, passages 428 are of sufficient size to at least partially form a section or portion of reservoir chamber 414. In some cases, connector end fittings 422 and 424 can be substantially identical to one another. In other cases, different configurations and/or constructions could be used.

In a preferred arrangement, connector end fittings 422 and/or 424 can include one or more securement features, such as a mounting plate 430, for example, that is dimensioned for securement on or along an associated structural component. In the arrangement shown in FIG. 8, for example, mounting wall portions or plates 430 can be secured to body wall portions 426 of connector end fittings 422 and 424 in a suitable manner, such as by way of a connector wall portion 432 that is rigidly affixed to the body wall portion, for example. In such case, mounting wall portions 430 can abuttingly engage web 158 of frame rail 152 and can be secured thereto using one or more threaded fasteners 434. It will be appreciated, however, that other configurations and/or arrangements could alternately be used.

In the arrangement shown in FIG. 8, flexible reservoir member 404 is disposed transverse to flexible reservoir members 402 and 406. As such, flexible reservoir member 404 extends along frame rail 152 between flexible reservoir members 402 and 406. Connector end fittings 422 and 424 form bend or otherwise extend through an angle of approximately 90 degrees. In this manner, a pressurized gas chamber having an increased volume with a reduced cross-sectional profile in the heightwise direction can be provided.

It is anticipated that a pressurized gas reservoir in accordance with the subject matter of the present disclosure, such as has been described above, for example, may be capable of achieving a wide variety of performance criteria, such as one or more of 10 years of service life, an operating pressure of 150 psig, at least a peak pressure of 750 psig, and/or at least a sustained operating temperature of 220° F.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A pressurizable gas reservoir dimensioned for securement between associated first and second structural components having a fixed spacing therebetween, said pressurizable gas reservoir comprising:
a first end member and a second end member disposed in longitudinally-spaced relation to said first end member such that a longitudinal axis is defined therebetween;
a flexible reservoir member extending peripherally about said longitudinal axis and axially between opposing first and second ends, said first end secured to said first end member such that a substantially fluid-tight seal is formed therebetween, said second end secured to said second end member such that a substantially fluid-tight seal is formed therebetween, said flexible reservoir member at least partially defining a reservoir chamber between said first and second end members that is capable of storing a quantity of pressurized gas for an extended duration of time;
said flexible reservoir member including a flexible wall at least partially formed from an elastomeric material, said flexible wall including an inner surface that at least partially defines said reservoir chamber, an outer surface opposite said inner surface, and at least one layer of filament reinforcing material at least partially embedded within said elastomeric material between said inner and outer surfaces; and,
said first and second end members maintained in substantially-fixed axial position relative to one another such that said reservoir chamber has an approximately constant volume with any substantial variation in said approximately constant volume being primarily due to elastomeric expansion and recovery of said flexible reservoir member as gas pressure within said reservoir chamber respectively increases and decreases.

2. A pressurizable gas reservoir according to claim 1, wherein said first end member is secured to the associated first structural component and said second end member is secured to the associated second structural component such that said first and second end members are maintained in substantially-fixed axial relation to one another.

3. A pressurizable gas reservoir according to claim 1 further comprising an elongated tie rod having a fixed length, said tie rod secured between said first and second end members and maintaining said first and second end members in substantially-fixed axial relation to one another.

4. A pressurizable gas reservoir according to claim 3 further comprising a first sealing element disposed in fluid communication between said first end member and said tie rod, and a second sealing element disposed in fluid communication between said second end member and said tie rod.

5. A pressurizable gas reservoir according to claim 1, wherein said at least one layer of filament material includes a first layer of filament material including a first plurality of lengths of filament material disposed at a first bias angle relative to said longitudinal axis, and a second layer of filament material including a second plurality of lengths of filament material disposed at a second bias angle relative to said longitudinal axis that is different from said first bias angle.

6. A pressurizable gas reservoir according to claim 5, wherein said first bias angle has a value within a range of between approximately 85 degrees and approximately 95 degrees relative to said longitudinal axis, and said second bias angle has a value within a range of between approximately minus 5 degrees and approximately plus 5 degrees relative to said longitudinal axis such that said first plurality of lengths of filament material are disposed transverse to said second plurality of lengths of filament material.

7. A pressurizable gas reservoir according to claim 5, wherein said first bias angle has a value within a range of between approximately 40 degrees and approximately 65 degrees relative to said longitudinal axis, and said second bias angle has a value within a range of between approximately 40 degrees and approximately 65 degrees relative to said longitudinal axis oriented opposite to said first bias angle.

8. A pressurizable gas reservoir according to claim 5, wherein said at least one layer of filament material includes a third layer of filament material including a third plurality of lengths of filament material disposed at one of said first bias angle and said second bias angle relative to said longitudinal axis.

9. A pressurizable gas reservoir according to claim 1 further comprising a restraining hoop extending peripherally about said outer surface of said flexible reservoir member.

10. A pressurizable gas reservoir comprising:
a first end member, a second end member and a first intermediate end member disposed between said first and second end members, said first intermediate end member including a first intermediate end member wall at least partially defining a first intermediate end member passage extending therethrough;

a first flexible reservoir member extending peripherally about a first longitudinal axis and axially between opposing first and second ends, said first end secured to said first end member such that a substantially fluid-tight seal is formed therebetween, said second end secured to said first intermediate end member such that a substantially fluid-tight seal is formed therebetween, said first flexible reservoir member including a first flexible wall at least partially formed from a first elastomeric material, and said first flexible reservoir member at least partially defining a first reservoir chamber portion between said first end member and said first intermediate end member;

a second flexible reservoir member extending peripherally about a second longitudinal axis and axially between opposing first and second ends, said first end secured to said second end member such that a substantially fluid-tight seal is formed therebetween, said second end secured to said first intermediate end member such that a substantially fluid-tight seal is formed therebetween, said second flexible reservoir member including a second flexible wall at least partially formed from a second elastomeric material, and said second flexible reservoir member at least partially defining a second reservoir chamber portion between said second end member and said first intermediate end member; and, said first reservoir chamber portion, said second reservoir chamber portion and said first intermediate passage of said first intermediate end member being disposed in fluid communication with one another to at least partially define a reservoir chamber capable of storing a quantity of pressurized gas for an extended duration of time;

at least said first end member, said second end member and said first intermediate end member being maintained in substantially-fixed position relative to one another such that said reservoir chamber has an approximately constant volume with any substantial variation in said approximately constant volume being primarily due to elastomeric expansion and recovery of said flexible reservoir member as gas pressure within said reservoir chamber respectively increases and decreases.

11. A pressurizable gas reservoir according to claim 10, wherein said pressurizable gas reservoir further comprises:

a third flexible reservoir member extending longitudinally between a first end and a second end, and said third flexible reservoir member includes a third flexible wall at least partially formed from a third elastomeric material; and, a second intermediate end member including a second intermediate end member wall at least partially defining a second intermediate end member passage extending therethrough;

said second intermediate end member disposed in spaced relation to said first intermediate end member with said first end of said third flexible reservoir member secured to said first intermediate end member such that a substantially fluid-tight seal is formed therebetween and said second end of said third flexible reservoir member is secured to said second intermediate end member such that a substantially fluid-tight seal is formed therebetween to at least partially define a third reservoir chamber portion with said first reservoir chamber portion, said second reservoir chamber portion, said third reservoir chamber portion, said first intermediate end member passage and said second intermediate end member passage at least partially defining said reservoir chamber.

12. A pressurizable gas reservoir according to claim 11, wherein said first longitudinal axis of said first flexible reservoir member and said second longitudinal axis of said second flexible reservoir member are disposed in approximate alignment with one another in laterally spaced relation to one another with said third flexible reservoir member oriented transverse to said first and second flexible reservoir members.

13. A pressurized gas system comprising:
a pressurizable gas reservoir according to claim 1;
a pressurized gas source selectively operative to generate pressurized gas; and,
a control device disposed in fluid communication between said pressurized gas source and said pressurizable gas reservoir such that pressurized gas can be selectively transferred into and out of said reservoir chamber of said pressurizable gas reservoir.

14. A pressurized gas system according to claim 13 further comprising:
a control system communicatively coupled with at least one of said pressurized gas source and said control device, said control system selectively operative to actuate and deactuate of said at least one of said pressurized gas source and said control device.

15. A vehicle comprising:
a first structural component;
a second structural component disposed in spaced relation to said first structural component and secured in substantially fixed position relative to said first structural component; and,
a pressurizable gas reservoir according to claim 1 with said first end member secured to said first structural component and said
second end member secured to said second structural component.

16. A method of assembling a pressurized gas system on a vehicle, said method comprising:
providing a first end member and a second end member;
providing a flexible reservoir member that extends between a first end and a second end; said flexible reservoir member including a flexible wall at least partially formed from an elastomeric material, said flexible wall including an inner surface, an outer surface opposite said inner surface, and at least one layer of filament reinforcing material at least partially embedded within said elastomeric material between said inner and outer surfaces;
securing said first end member to said first end of said flexible reservoir member such that a substantially fluid-tight seal is formed therebetween;
securing said second end member to said second end of said flexible reservoir member such that a reservoir chamber is at least partially defined therebetween; and,
securing said first and second end members in substantially fixed relation to one another to one another between said first and second structural components such that said reservoir chamber has an approximately constant volume with any substantial variation in said approximately constant volume being primarily due to elastomeric expansion and recovery of said flexible reservoir member as gas pressure within said reservoir chamber respectively increases and decreases.

17. A method according to claim 16, wherein securing said first and second end members in substantially fixed relation to one another includes securing said first end member to a first structural component and securing said second end member to a second structural component disposed in spaced relation to said first structural component and secured in substantially fixed position relative to said first structural component.

18. A method according to claim 16 further comprising:
providing an elongated tie rod having a fixed length; and,
securing said tie rod secured between said first and second end members to maintaining said first and second end members in substantially-fixed axial relation to one another.

19. A method according to claim 18 further comprising:
providing a first sealing element and a second sealing element;
installing said first sealing element in fluid communication between said first end member and said tie rod; and,
installing said second sealing element in fluid communication between said second end member and said tie rod.

20. A method according to claim 16, wherein securing said first end member to said first end of said flexible reservoir member includes crimping at least a portion of said first end member around a portion of said flexible reservoir member.

* * * * *